Sept. 25, 1962 F. W. SCHMIDT 3,055,717
JOURNAL BEARING
Filed Sept. 5, 1961
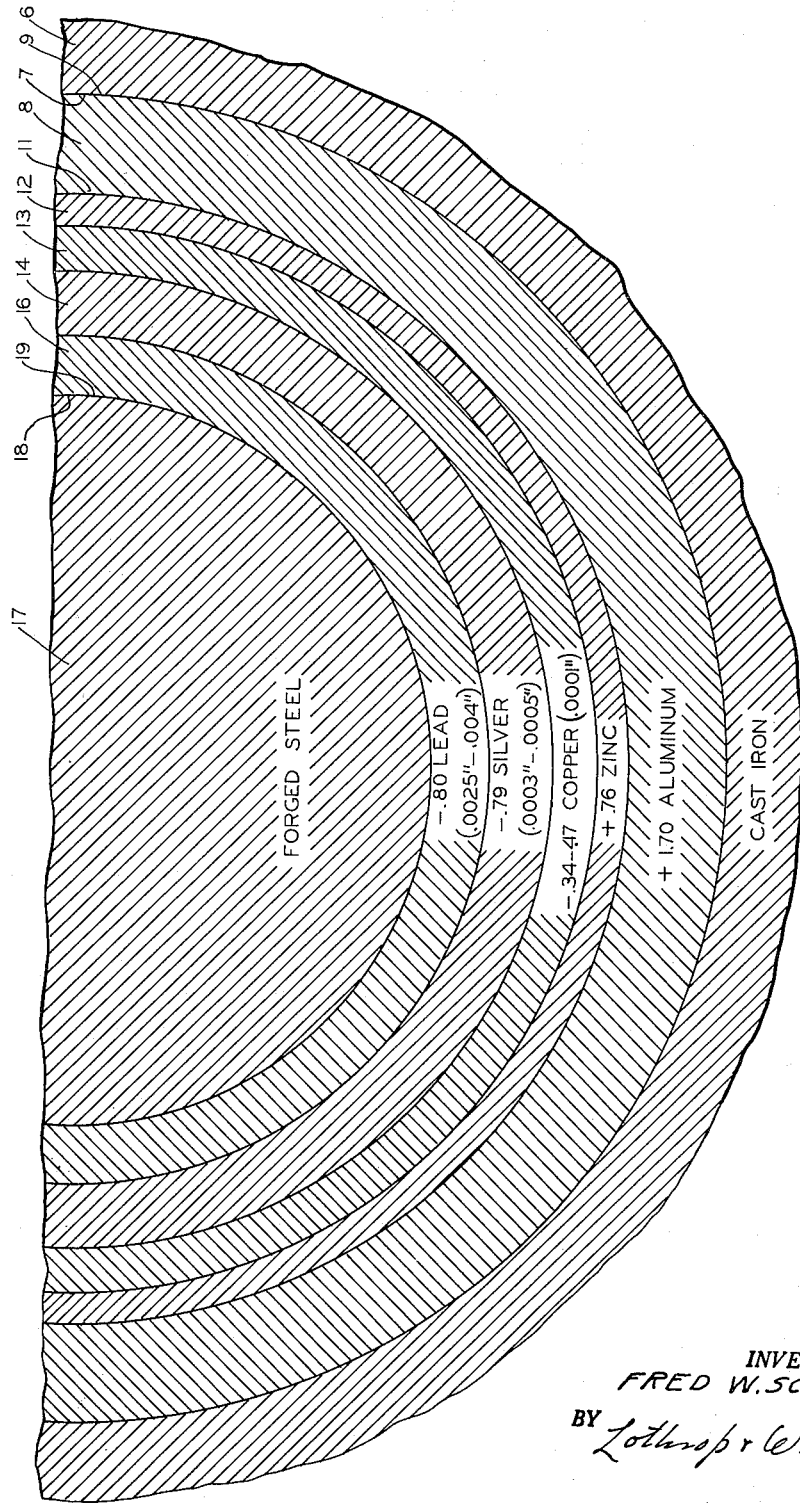
INVENTOR.
FRED W. SCHMIDT
BY Lothrop & West
ATTORNEYS 3,055,717
JOURNAL BEARING
Fred W. Schmidt, San Francisco, Calif., assignor to General Metals Corporation, Oakland, Calif., a corporation of California
Filed Sept. 5, 1961, Ser. No. 135,820
4 Claims. (Cl. 308—237)

My invention relates primarily to sleeve bearings for use in journals of rotating lubricated shafts, particularly bearings for use on diesel dual fuel spark ignited engine crank shafts which are subject to varying loads, temperatures and operating conditions. In some relatively heavy but relatively high speed marine engines, the bearing life has been unduly short, causing shut-downs and loss of time to the detriment of the engine operator.

It is therefore an object of the invention to provide an improved journal bearing having a relatively long bearing life.

Another object of the invention is to provide an improved journal bearing which can readily be utilized in connection with substantially standard diesel engine crank cases and crank shafts or any other reciprocating machine.

Another object of the invention is to provide a bearing which will survive a considerable amount of abuse as well as to survive for a protracted period under normal use.

A still further object of the invention is to provide a journal bearing which can be fabricated with techniques that are usually and readily available.

Another object of the invention is in general to provide an improved journal bearing.

These objects together with the foregoing objects have been practically attained in the form of journal bearing described in the accompanying description and illustrated in the accompanying drawing in which:

The FIGURE is a partial cross section of a journal bearing constructed in accordance with the invention showing the various constituent features in their relative relationship.

While a bearing pursuant to the invention can be made for various different environmental conditions, it has been in the present instance particularly designed and fabricated for use with regard to marine and stationary engine crank shafts in which because of velocity or load or both the previous bearing experience has been unsatisfactory.

The bearing is usually installed in a crank case 6 of a diesel engine, the crank case normally being made of cast iron having a bore surface 7 against which the bearing is rested for use. The bearing itself includes an outer semicircular cylindrical shell 8 conveniently made of aluminum especially cast aluminum; for example, of the sort in the trade designated "Alcoa 750–T101." The aluminum shell is a major fraction or more of an inch in radial thickness depending upon the particular size and capacity of the engine for which it is intended, the thickness or size of the shell 8 not being critical.

The shell 8 has an exterior surface 9 arranged in close thermal contact with the interior surface 7 of the crank case so as to effectuate rapid heat transfer therebetween. The shell 8 has an internally concave cylindrical surface 11 substantially semicircular in extent. Onto this surface 11 is initially deposited a relatively thin layer 12 of zinc. While the zinc layer can be electroplated onto the aluminum shell 8, it is preferred to deposit the zinc simply by a dipping process.

After the zinc layer 12 has been deposited, a copper layer 13 is laid down by electrodeposition, the copper layer being approximately .0001 of an inch in thickness. While this thickness is not highly critical it is desired to have not much more than what is technically known as a copper "strike" superimposed on the zinc 12.

Next deposited electrolytically upon the copper layer 13 is a silver layer 14. The electrodeposition of the silver continues until the silver layer is from .0003 to .0005 of an inch in thickness. Again, the silver layer thickness is not highly critical although the range given produces excellent results in practice. Inside the silver layer 14 there is next electrodeposited a lining layer 16. This lining layer is the one which is actually next to the turning crank shaft 17. Normally the crank shaft 17 is of forged steel and is superfinished by means of stones and is not ground. Adequate lubrication by the forced circulation of oil is provided between the outer surface 18 of the crank shaft and the inner surface 19 of the lining layer 16.

The lining layer is preferably of a lead-tin alloy, the lead being in the proportion of 90 percent and the tin being in the proportion of 10 percent. Again, this especial proportionality is not highly critical although the values given have produced excellent results in practice. The drawing designates the lining layer as "lead" since the amount of tin, although variable is always small.

Conveniently the lining layer 16 when finished is from .0025 to .004 of an inch thick. This particular thickness range can be achieved during electroplating, but it is preferred to overplate; that is, to deposit a lining substantially thicker than the values given for the layer 16 and subsequently to machine away the excess. The actual exposed surface 19 of the lining layer 16 after the processing has been completed is comparable to a surface which has been cut away or exposed by cutting.

The particular radial distance between the surface 19 and the surface 18 when lubrication is being supplied and the bearing is in use is within the usual clearance ranges normally provided by engineers. Under some circumstances, particularly if lubrication fails or there are other anomalous conditions of operation there may actually be physical or metallic contact between the crank shaft 17 and the lining layer 16. This does not produce any deleterious effect on the shaft although it may eventually result in the wearing away of the bearing perhaps even through all of the interior layers and into the aluminum layer 8. This is not a desired condition for continued operation, but the bearing does serve temporarily under these extreme conditions and permits the engine to be operated until it can be repaired.

Under normal conditions of operation bearings of the sort disclosed herein when substituted for the previously available bearings have indicated an increase in bearing life of approximately ten times; for example, from an average life under four thousand hours to an average life in excess of forty thousand hours.

All of the explanations for this increase in bearing life are not presently known, yet it appears that one of the important factors is that the metallic layers utilized are laid down or arranged in the order of decreasing values of electrode potential in the electromotive force series of elements as they are considered from the exterior of the bearing radially inwardly. For example, in the usual table the exterior aluminum layer 8 is given a potential value of $+1.70$. Next, zinc is given a value of $+.76$. The copper, depending upon its valence, is given a value of $-.34$ to $-.47$. The silver is given a value of $-.79$ whereas the lead in the lining layer 16 is given a value of $-.80$ in its valence 4 form. The value usually given for tin is $+.136$. It appears in practice that the small amount of tin in the lining layer does not adversely affect the continual decreasing order of electromotive potential values.

What is claimed is:
1. A journal bearing comprising an aluminum semicircular cylindrical shell having on the interior side thereof first a zinc layer, second a copper layer, third a silver layer and finally an exposed lining layer including lead and tin.
2. A journal bearing as in claim 1 in which said lining layer is substantially 90 percent lead and 10 percent tin.

3. A journal bearing as in claim 1 in which said copper layer is substantially .0001 of an inch thick, said silver layer is substantially .0003–.0005 of an inch thick and said lining layer is substantially .0025–.004 of an inch thick.

4. A journal bearing as in claim 1 in which said lining layer has an exposed surface of the same nature as results when said lining layer is machined.

References Cited in the file of this patent

UNITED STATES PATENTS

| | | |
|---|---|---|
| 2,386,951 | Howe | Oct. 16, 1945 |
| 2,968,089 | Fike | Jan. 17, 1961 |

FOREIGN PATENTS

| | | |
|---|---|---|
| 750,557 | Great Britain | June 20, 1956 |